Sept. 11, 1928.
R. W. BAILEY
1,684,303
AUTOMOTIVE BUS
Filed July 24, 1925
2 Sheets-Sheet 1
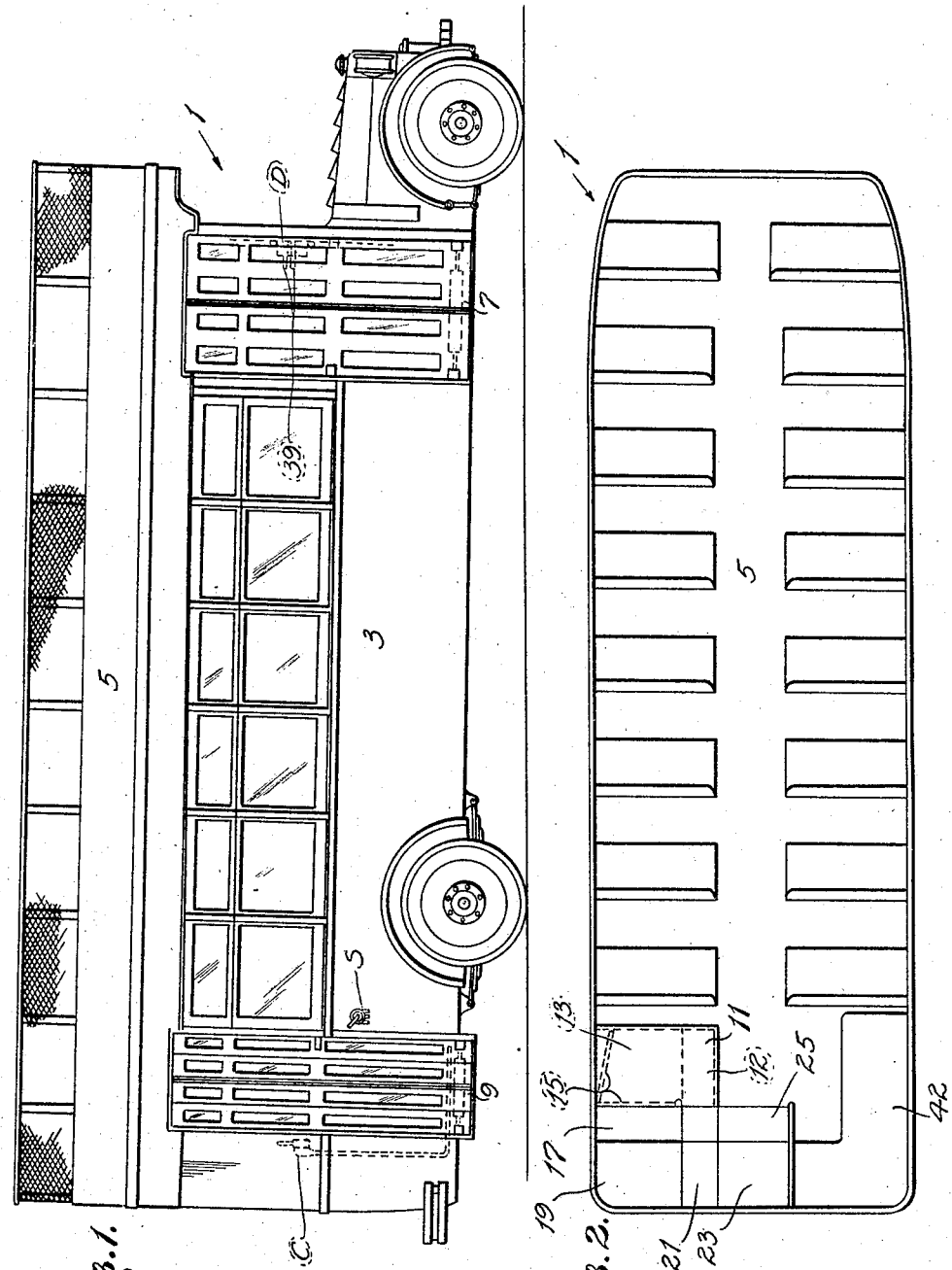

Sept. 11, 1928.
R. W. BAILEY
AUTOMOTIVE BUS
Filed July 24, 1925
1,684,303
2 Sheets-Sheet 2
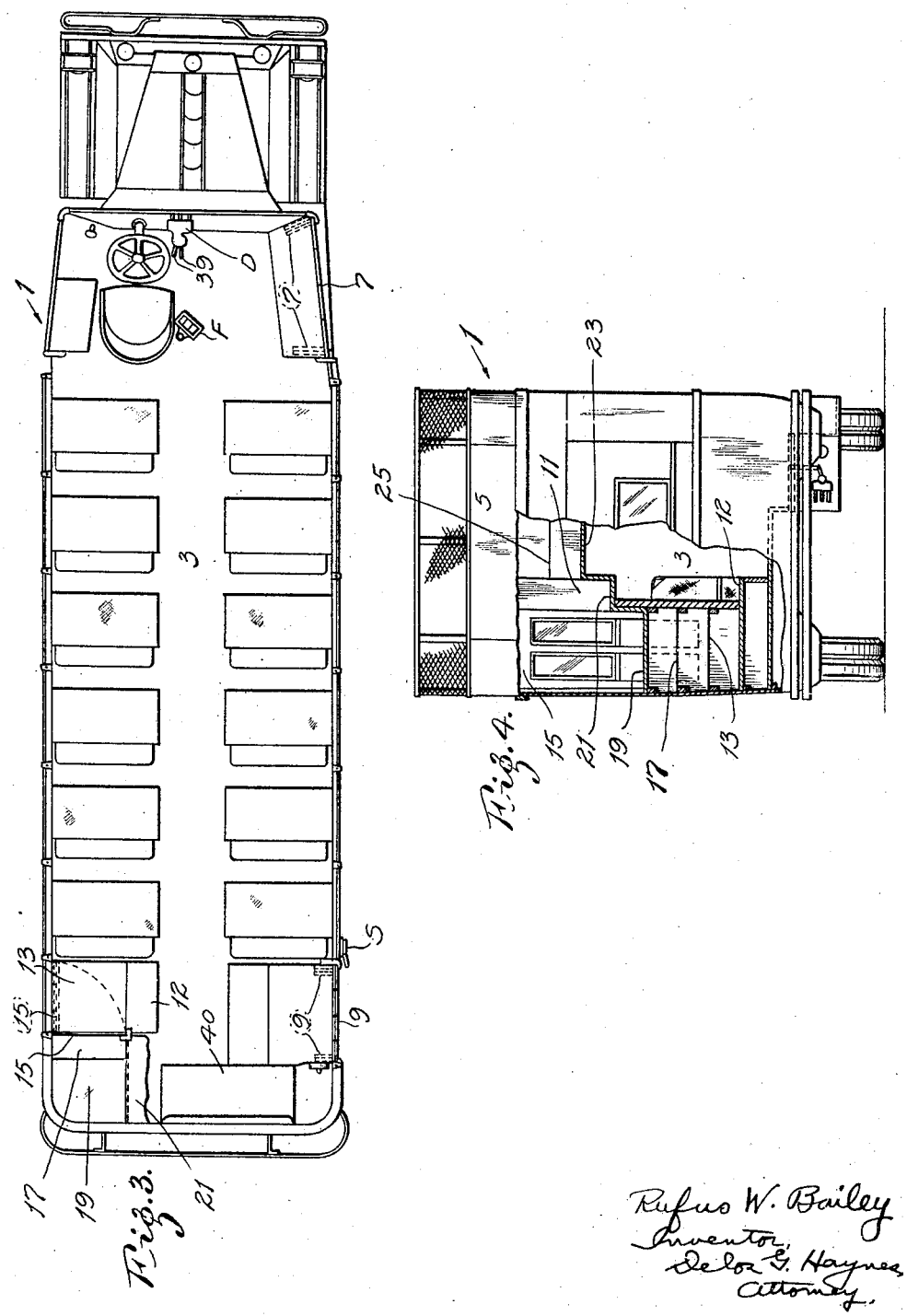

Patented Sept. 11, 1928.

1,684,303

UNITED STATES PATENT OFFICE.

RUFUS W. BAILEY, OF KANSAS CITY, MISSOURI.

AUTOMOTIVE BUS.

Original application filed December 15, 1924, Serial No. 755,901. Divided and this application filed July 24, 1925. Serial No. 45,772.

This invention relates to passenger vehicles, and with regard to certain more specific features, to motor coaches or busses for use on highways and/or metropolitan thoroughfare.

This application is a division of my patent application Serial No. 755,901, filed December 15, 1924.

Among the several objects of the invention may be noted the provision of a motor coach involving in its normal operation only one-way passenger traffic on its lower deck; a double decked coach with a door in the passage between decks and one which is particularly safe in operation under all exigencies of heavy and fast traffic. Other objects will appear in part and will be in part pointed out hereinafter.

The invention accordingly comprises the features of construction, elements and combinations of elements, and arrangements of parts which are exemplified in the structure hereinafter described, and the scope of the application of which will be indicated in the following claim.

In the accompanying drawings, in which is shown one of various possible embodiments of the invention, Fig. 1 is a side elevation of the motor coach;

Fig. 2 is a ground plan view of the upper deck and stairway;

Fig. 3 is a ground plan of the lower deck; and

Fig. 4 is a rear elevation of the coach showing parts broken away.

Similar reference characters indicate corresponding parts throughout the several views of the drawings.

*Deck arrangement.*

Referring now more particularly to Figs. 1 to 3 there is illustrated at 1 a motor coach comprising an enclosed lower deck 3 and an open upper deck 5.

The lower deck 3 is provided forwardly thereof with a set of doors 7 to be used as an entrance to the coach. A fare box F is provided near the driver so that passengers may here deposit their fares, should it be desired to operate the coach with one man, namely, the driver thereof.

Rearwardly on said deck is provided a set of doors 9 to be used as an exit only, under normal conditions as will be described later.

The sets of doors 7 and 9 are on the right side of the coach. The doors 7 and 9 are operable to opened and closed positions by way of various valves, air lines and linkages which it is not necessary to describe in detail in this application. It should be noted however that by means of handles 39 of a compound valve D, the driver of the coach may open or close either or both the front or rear doors 7 and 9 when passengers desire to enter the former and leave the latter.

A valve C at the inside rear of the coach is provided for the use of a conductor when one is employed and by operation of the valve C said conductor opens and closes the rear door when passengers desire to leave or enter.

A valve S located at the outside rear of the coach is provided for the use of a street fare collector when one is employed, and by operation of the valve S said collector, opens and closes the rear door when passengers wish to enter only. Under normal conditions all passengers enter the front door and leave by the rear door and hence there is substantially only one-way traffic on the lower deck.

No passenger is ever permitted to pass out of the front door so that even though the conductor or collector permit ingress of passengers at the rear door under stress of certain circumstances, yet the whole lower aisle will never be given over to two way traffic. The lower aisle is longitudinally and centrally located.

Opposite the rear doors 9 on the left side of the coach, (see Figs. 2, 3 and 4) is located a stairway leading from the closed lower to the open upper deck. This stairway comprises a penthouse 11 under which are located step 12 and step-platform 13. The penthouse is in continuous open communication with the lower deck and its entrance is substantially opposite and facing the deck exit. The step platform 13 comprises a raised floor for the penthouse. Rearwardly in said penthouse 11 is placed a self closing door 15 swinging forwardly on a center near the left wall of the coach. Outside of the penthouse and rearwardly thereof is the step 17 leading upwardly and to the rear of the coach. The step 17 leads directly to another step-platform 19 in the left rear corner of the coach. The platform 19 serves to direct a passenger toward the right side of the coach and up on the step 21. From here a third step-platform 23 is reached which serves to direct a passenger toward the central aisle of the upper deck. However another step 25 must be used to reach said aisle. Passengers face forwardly as they enter said central aisle.

The ascent from the lower deck is made in eight steps as follows:

One, step 12;
Two, step-platform 13 (open door, turn left);
Three, step 17 (out of penthouse and lower deck);
Four, step-platform 19 (turn left);
Five, step 21;
Six, step-platform 23 (turn left to front of coach);
Seven, step 25;
Eight, upper deck 5 (to seat).

Thus a passenger, by means of a winding staircase passes expeditiously from the lower to the upper deck, the door 15 closing behind him. The door prevents stray air currents from entering the enclosed lower deck and the partially enclosed stairway outside of the penthouse serves to lend safe passage to a passenger when the coach accelerates or decelerates; as well as to prevent wind from entering the door 15 when it is open.

Passengers leave the upper deck by means of the stairs just described. It will be noted that there is no open rear platform on this coach. Should a passenger stumble on the enclosed stairs he will not be precipitated to the street from the bottom of the stairs.

Also, the inclosed portion beneath the stairs (see Figs. 3 and 4) serves to conserve space inasmuch as the conductor may occupy part of this space. He does so in the warmth of the lower deck and hence can perform his duties to better advantage than if he were on a cold platform. To put the conductor within the coach for the sake of his comfort in the ordinary coach, would take up too much space which might otherwise be given over to seating passengers. Hence it is clear that the present arrangement turns a dangerous, almost useless open rear platform to a comfortable space for the operations of a conductor and at the same time diminishes the chances for drafts entering the lower deck. Furthermore a passenger seat such as that indicated at 40 may be put under the stairs. Hence the capacity of the coach is increased.

It should also be noted that the capacity of the coach is further increased by the fact that in going to the upper deck the stairs do not occupy the full width of the coach. Hence another seat 42 on the upper deck may be added at the right rear of the coach.

The penthouse encloses the swinging door. It breaks the sweep of air into the coach and by surrounding the various positions of the swinging door prevents passengers from getting behind it and preventing the operation thereof such as if it were in the open.

Attention is again called to the fact that under normal operating conditions all passengers enter the lower deck at the front doors 7, and in choosing a seat, pass rearwardly on the lower deck. Upon leaving, they pass rearwardly to the rear doors thus obviating the necessity for any forward traffic in the aisle of the lower deck; that is, this is a one-way aisle. The advantages of such a condition are clear.

Open positions of the doors 7 and 9 are shown in dotted lines in Fig. 3 and an open position of the door 15 in Fig. 2.

From the above it will be seen that the several objects of the invention are attained and other advantageous results achieved.

As many modifications of the embodiments above illustrated might be made without departing from the spirit or scope of the present invention, it is intended that the above description and accompanying drawings and claim shall be interpreted as illustrative and not in a limiting sense.

I claim:

A coach comprising a lower deck having a longitudinal central aisle, an upper deck having a similar aisle, an exit at the right rear of the lower deck, and a penthouse in continuous open communication with the lower deck, having its entrance substantially opposite and facing the deck exit, the floor thereof being raised, a penthouse exit facing the rear of the coach having a self-closing door therein, a winding staircase leading from the penthouse exit to said central aisle of said upper deck adapted to lead passengers to said upper deck, said passengers facing forwardly into said upper aisle as said passengers take their final step on said upper deck.

In testimony whereof, I have signed my name to this specification this 21st day of July, 1925.

RUFUS W. BAILEY.